(12) United States Patent
Doppler et al.

(10) Patent No.: US 10,781,899 B2
(45) Date of Patent: Sep. 22, 2020

(54) ACTUATOR

(71) Applicant: Aktiebolaget SKF, Gothenburg (SE)

(72) Inventors: Manuel Doppler, Wehr (DE); Johannes Federer, Winterthur (CH); Christian Schultheiss, Pfaeffikon (CH); Marcel Soltermann, Sankt Pantaleon (CH)

(73) Assignee: Aktiebolaget SKF, Gothenburg (SE)

( * ) Notice: Subject to any disclaimer, the term of this patent is extended or adjusted under 35 U.S.C. 154(b) by 219 days.

(21) Appl. No.: 15/830,763

(22) Filed: Dec. 4, 2017

(65) Prior Publication Data

US 2018/0163829 A1    Jun. 14, 2018

(30) Foreign Application Priority Data

Dec. 12, 2016   (DE) .................. 10 2016 224 672

(51) Int. Cl.
| | | |
|---|---|---|
| *F16H 25/20* | (2006.01) | |
| *F16H 25/22* | (2006.01) | |
| *A61G 13/04* | (2006.01) | |

(52) U.S. Cl.
CPC ......... *F16H 25/2006* (2013.01); *A61G 13/04* (2013.01); *F16H 25/2266* (2013.01); *F16H 2025/209* (2013.01); *F16H 2025/2012* (2013.01); *F16H 2025/228* (2013.01); *Y10T 74/19902* (2015.01)

(58) Field of Classification Search
CPC .......... F16H 25/2006; F16H 2025/209; F16H 25/2266; F16H 2025/228; F16H 2025/2012; A61G 13/04; Y10T 74/19902; Y10T 74/18728
See application file for complete search history.

(56) References Cited

U.S. PATENT DOCUMENTS

| | | | | |
|---|---|---|---|---|
| 4,872,795 | A * | 10/1989 | Davis .................... | F16B 33/002 411/433 |
| 5,117,706 | A * | 6/1992 | Kempe .................... | B23Q 5/56 74/441 |
| 10,309,503 | B2 * | 6/2019 | Combernoux ...... | F16H 25/2266 |
| 10,406,051 | B2 * | 9/2019 | Doppler ................. | F16H 55/06 |
| 2013/0019706 | A1 * | 1/2013 | Cronin ................ | F16H 25/2006 74/441 |
| 2018/0187758 | A1 * | 7/2018 | Shin ..................... | B62D 5/0424 |

* cited by examiner

*Primary Examiner* — Jeremy R Severson
(74) *Attorney, Agent, or Firm* — Laurence A. Greenberg; Werner H. Stemer; Ralph E. Locher

(57) ABSTRACT

An actuator includes a housing, a first nut in the housing, a second nut in the housing, and a threaded spindle screwed into the first nut and the second nut. The first nut exerts a first force in a first direction on the threaded spindle, and the second nut exerts a second force in a second direction on the threaded spindle, the first direction being different than the second direction.

9 Claims, 2 Drawing Sheets

ACTUATOR

CROSS-REFERENCE

This application claims priority to German patent application no. 10 2016 224 672.0 filed on Dec. 12, 2016, the contents of which are fully incorporated herein by reference.

BACKGROUND

An actuator is known that includes a threaded spindle and a gas spring. The gas spring is coupled with the threaded spindle in the longitudinal direction of the threaded spindle. Actuators without gas springs are also known; these actuators have a certain axial clearance.

Furthermore, operating tables are known that are moved using a hydraulic cylinder, which hydraulic cylinder is largely clearance-free.

SUMMARY

One feature of the present disclosure is directed to providing an actuator which, when installed in an operating table or in a treatment chair, permits a comfortable movement thereof.

The disclosed actuator includes one first and at least one second nut and a threaded spindle which is screwed into the two nuts. The first nut exerts a first force on the threaded spindle, and the second nut exerts a second force on the threaded spindle, and the direction of the first force is different from the direction of the second force. Such an actuator, when installed in an operating table or in a treatment chair, permits a comfortable movement thereof. In particular, the actuator can have an axial clearance that is very small so that the actuator does not cause or allow jerky movement of the operating table or of the treatment chair when the actuator is responsible for longitudinal or lateral tilting of the table or chair, even when the actuator is disposed near a pivot point for the corresponding movement, when a change of the load direction is experienced by the actuator. Here the absence of the jerky movement leads to an increased comfort during operating table or treatment chair movement. In particular, the actuator has a very compact construction and a high stiffness. In addition, the actuator is particularly cost effective.

Furthermore, there is an angle of at least 30° between the direction of the first force and the direction of the second force. The angle is preferably at least 140°.

In addition, an actuator including a threaded spindle and at least one nut is disclosed, wherein an end geometry of an internal thread of the nut is generated at least partially by a screwing-in of the threaded spindle. According to the disclosure such an actuator installed in an operating table or in a treatment chair permits a comfortable movement thereof. In particular, it a small axial clearance of the actuator can be achieved so that the actuator does not permit jerky movement of the operating table or of the treatment chair when the actuator is responsible for longitudinal or lateral tilting of the chair or table, even when the actuator is disposed near a pivot point for the corresponding movement, with a change of the load direction that is experienced by the actuator. Here the absence of the jerky movement leads to an increased comfort with a movement of the operating table or of the treatment chair. In particular, the actuator has a very compact construction and a high stiffness. Furthermore, the actuator is particularly cost-effective.

The actuator preferably includes at least one first component including a partial region of an inner thread which first component exerts a force on the threaded spindle essentially perpendicular to an axis of rotation of the threaded spindle. It can thereby be achieved that an axial clearance of the actuator is small over a long service life.

The actuator preferably includes a cavity between the nuts, which cavity offers space for a further nut that bears a load in the case a nut of the actuator breaks and thus prevents a rapid shifting of the table.

Further advantages arise from the following description of the drawings. Exemplary embodiments of the disclosure are depicted in the drawings. The drawings, the description, and the claims contain numerous features in combination. The person skilled in the art will also advantageously consider the features individually and in further meaningful combinations.

DETAILED DESCRIPTION

Figure 1:
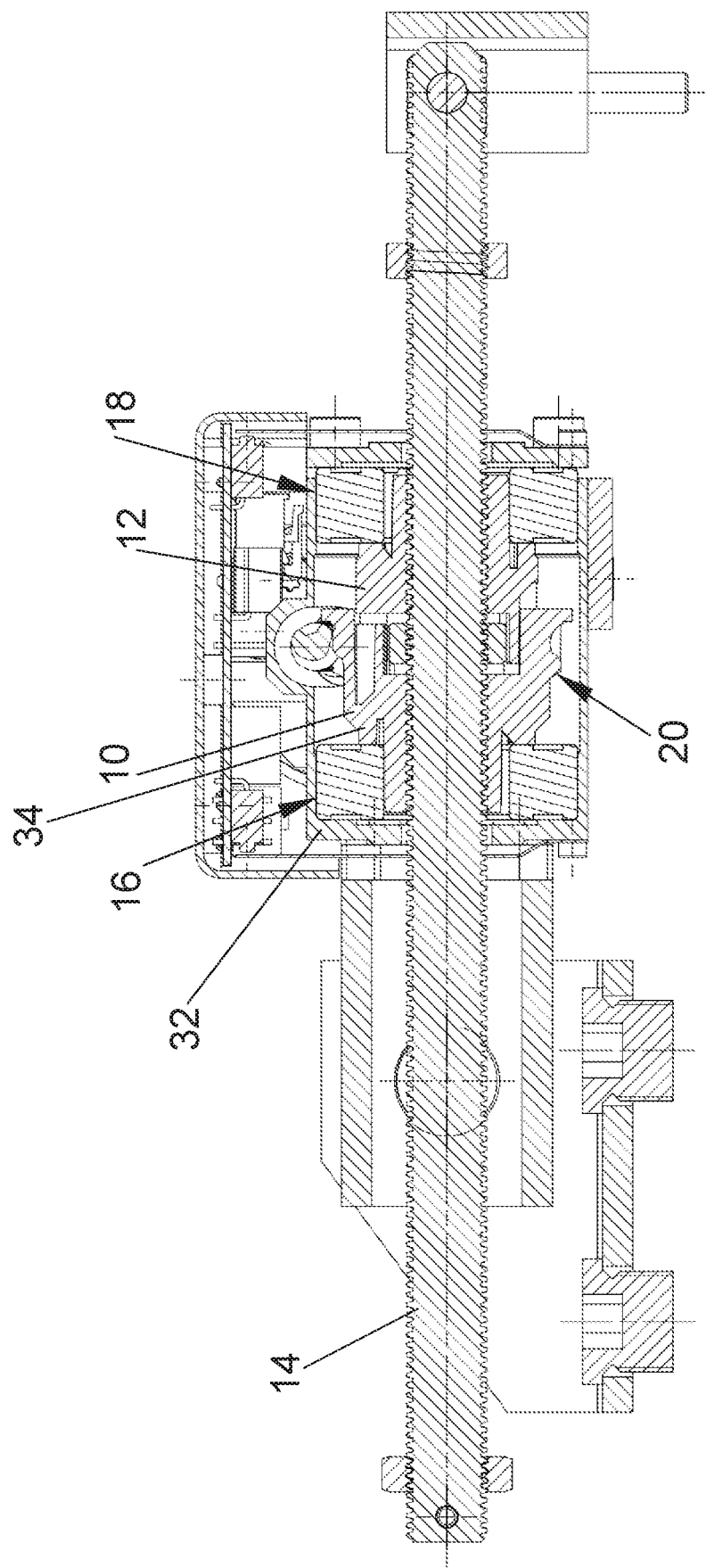
FIG. 1 is a longitudinal section through an actuator according to a first exemplary embodiment of the disclosure.

FIG. 1 shows an actuator that includes a first nut 10 and a second nut 12. A threaded spindle 14 is screwed into the nuts in a clearance-free manner. The nuts are disposed in a housing 32. The actuator further includes a first rolling-element bearing 16 and a second rolling-element bearing 18. The two rolling-element bearings are configured as deep groove ball bearings. The first rolling-element bearing 16 is disposed axially between the housing 32 and a part of the nut 10, and specifically such that the housing 32 exerts a force on the outer ring of the rolling-element bearing 16 and the part of the nut exerts a force on the inner ring of the rolling-element bearing 16. This produces a preload on the bearing 16 and at the same time presses the nut 10 against the threaded spindle 14 in the axial direction away from the rolling-element bearing 16. Furthermore, the rolling-element bearing 16 is disposed in an analogous manner between the housing 32 and a part of the nut 12 such that the housing exerts a force in the axial direction on the outer ring of the rolling-element bearing 18, and the part of the nut 12 exerts a force in the axial direction away from the rolling-element bearing 16 on the inner ring of the rolling-element bearing 18. The inner ring of the rolling-element bearing 18 exerts a force on the nut 12, which pushes the nut 12 against the threaded spindle 14 in the axial direction away from the rolling-element bearing 18. Consequently the force that the nut 10 exerts on the threaded spindle 14 and the force that the nut 12 exerts on the threaded spindle 14 are directed parallel but opposite with respect to their direction, and these opposite directions are parallel to an axis of rotation of the threaded spindle 14. The nuts 10, 12 further form a claw coupling 20 by which torques are transmitted between the nuts 10, 12. The rolling-element bearings support the nuts rotatably with respect to the housing 32. Since the nuts 10, 12 exert forces onto the threaded spindle 14 in opposing directions the axial clearance of the actuator is minimized. A drive is operably connected to the threaded spindle 14 to rotate the threaded spindle 14 for operating the actuator.

In an installed state the actuator is part of an operating table or a treatment chair and can be used to produce a longitudinal or a lateral tilting of the operating table or of the treatment chair. Assembled as disclosed, the threaded spindle 14 and the nuts are self-locking. There is no additional brake for braking the threaded spindle 14. The pitch of the thread of the threaded spindle 14 is relatively low. Since the threaded spindle 14 is self-locking, a clearance of a drive of the actuator need not be considered for monitoring the axial clearance of the actuator.

Figure 2:
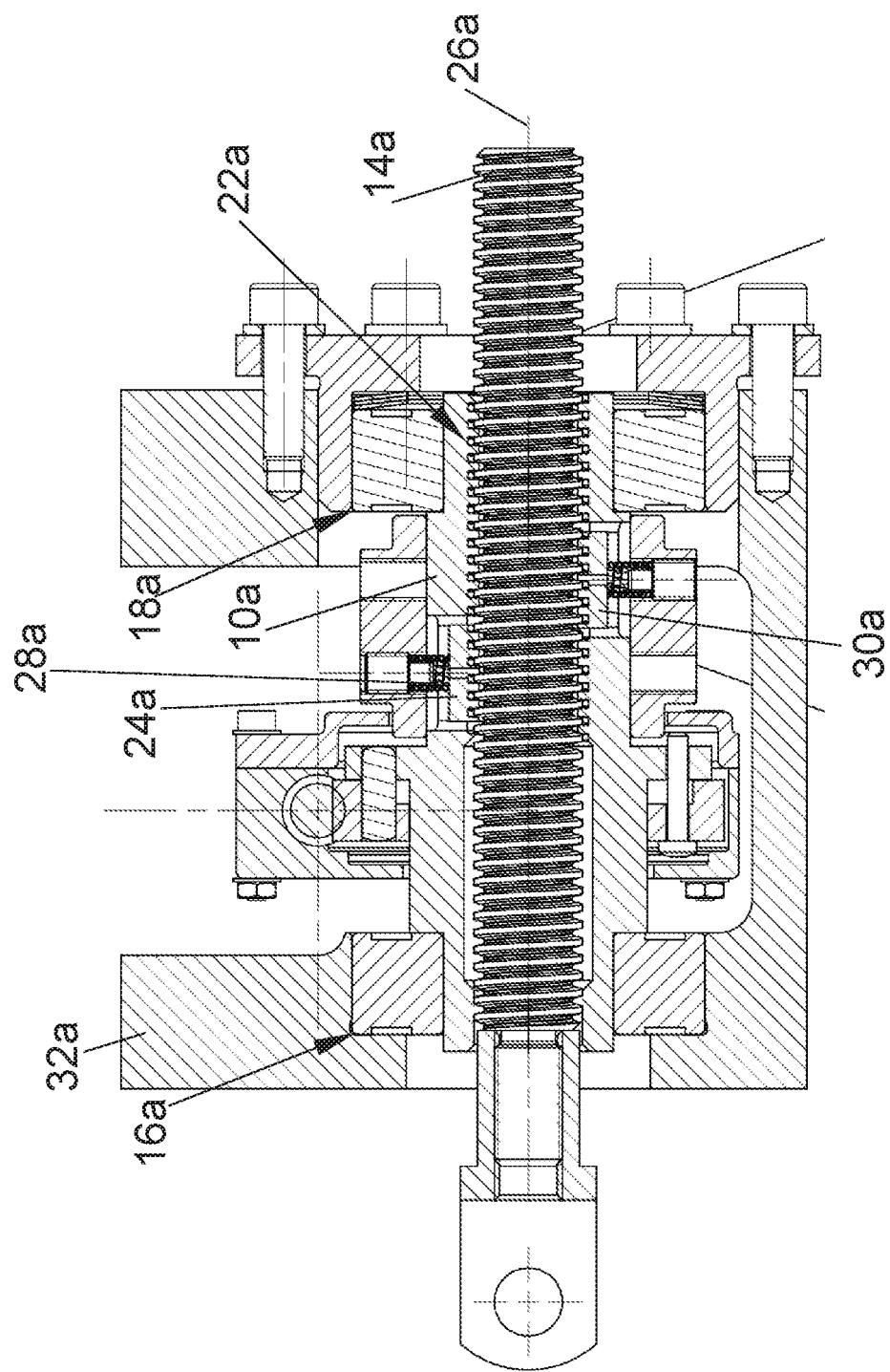
FIG. 2 is a longitudinal section through an actuator according to a second exemplary embodiment of the disclosure.

An alternative exemplary embodiment is depicted in FIG. 2. Components, features, and functions remaining essentially identical are in general numbered with the same reference numbers. However, to differentiate the exemplary embodiments, the letter "a" is added to the reference numbers of the exemplary embodiments in FIG. 2. The following description is essentially limited to the differences to the exemplary embodiment in FIG. 1, wherein with respect to components, features, and functions remaining the same, reference can be made to the description of the exemplary embodiment in FIG. 1.

FIG. 2 shows an alternative exemplary embodiment of an actuator according to the disclosure that includes a nut 10a and a threaded spindle 14a screwed into the nut. A final geometry of an internal thread 22a of the nut 10a is partially generated by screwing the threaded spindle 14a into the nut 10a.

During the manufacture of the actuator, the nut 10a has an internal thread that, before the threaded spindle 14a has been screwed into the nut 10a, is narrower than the thread of the threaded spindle 14a. The threaded spindle 14a has a trapezoidal thread, and the nut 10a has a rectangular thread. When the threaded spindle 14a is screwed into the nut 10a for the first time, the thread of the nut is newly grooved, i.e., widened, which has the result that an axial clearance of the screwed-in threaded spindle is minimal relative to the nut.

When assembled, the actuator includes a first component 24a including a partial region of an internal thread, which first component 24a exerts a force on the threaded spindle 14a perpendicular to an axis of rotation 26a of the threaded spindle 14a. The force is generated by a spring element 28a of the actuator, which spring element 28a is configured as a compression spring; the spring element 28a abuts on the component 24a. In addition, the actuator includes a second component 30a including a partial region of an internal thread, which second component 32a exerts a force on the threaded spindle 14a perpendicular to the axis of rotation of the threaded spindle 14a. The component 30a is disposed displaced in the axial direction, i.e., along the axis of rotation, with respect to the component 24a.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved actuators.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Nut
12 Nut
14 Threaded spindle
16 Rolling-element bearing
18 Rolling-element bearing
20 Clamp coupling
22 Internal thread
24 Component
26 Axis of rotation
28 Spring element
30 Component
32 Housing
34 Part

What is claimed is:

1. An actuator comprising:
a housing;
a first nut in the housing;
a second nut in the housing;
a threaded spindle screwed into the first nut and the second nut, wherein the first nut exerts a first force in a first direction on the threaded spindle, and the second nut exerts a second force in a second direction on the threaded spindle, the first direction being different than the second direction; and
at least one first rolling-element bearing having an inner ring and an outer ring, wherein the inner ring exerts the first force on the first nut.

2. The actuator according to claim 1, wherein there is an angle of at least 30° between the first direction and the second direction.

3. The actuator according to claim 1, further including at least one second rolling-element bearing having an inner ring and an outer ring, wherein the inner ring of the at least one second rolling-element bearing exerts the second force on the second nut.

4. The actuator according to claim 3, wherein the first nut is coupled to the second nut by a torque-transmitting claw coupling.

5. The actuator according to claim 1, including a cavity between the first and second nuts, said cavity configured to receive a third nut arranged to receive a load if the first nut or the second nut breaks.

6. The actuator according to claim 1, wherein the threaded spindle is free of clearance with respect to at least one of the first and second nuts.

7. An operating table or a treatment chair including an actuator according to claim 1.

8. The actuator according to claim 1,
wherein the first nut has a first shoulder and the second nut has a second shoulder,
wherein the housing includes a first annular surface and a second annular surface, the actuator including:

a first rolling-element bearing having an inner ring and an outer ring, the outer ring of the first rolling-element bearing contacting the first annular surface and the inner ring of the first rolling-element bearing contacting the first shoulder, and a second rolling-element bearing having an inner ring and an outer ring, the outer ring of the second rolling-element bearing contacting the second annular surface and the inner ring of the second rolling-element bearing contacting the second shoulder.

9. The actuator according to claim 8, wherein the first rolling-element bearing and the second rolling-element bearing have a negative clearance.

\* \* \* \* \*